(12) United States Patent
Koehler et al.

(10) Patent No.: US 11,530,669 B2
(45) Date of Patent: Dec. 20, 2022

(54) VARIABLE BURN-RATE SOLID ROCKET MOTOR IGNITION METHOD

(71) Applicant: Raytheon Company, Waltham, MA (US)

(72) Inventors: Frederick B. Koehler, Tucson, AZ (US); Mark J. Meisner, Tucson, AZ (US); Jeff L. Vollin, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/017,741

(22) Filed: Sep. 11, 2020

(65) Prior Publication Data
US 2022/0082066 A1    Mar. 17, 2022

(51) Int. Cl.
*F02K 9/26* (2006.01)
*F02K 9/32* (2006.01)
*F02K 9/95* (2006.01)

(52) U.S. Cl.
CPC .................. *F02K 9/26* (2013.01); *F02K 9/32* (2013.01); *F02K 9/95* (2013.01)

(58) Field of Classification Search
CPC ..... F02K 9/08; F02K 9/18; F02K 9/26; F02K 9/95
See application file for complete search history.

(56) References Cited

U.S. PATENT DOCUMENTS 2,956,401 A * 10/1960 Kane .......................... F02K 9/26
60/250
3,712,227 A * 1/1973 Turner ...................... F02K 9/95
102/380

(Continued)

FOREIGN PATENT DOCUMENTS

| GB | 994184 A * | 6/1965 | ............... F02K 9/10 |
| GB | 2028981 A | 3/1980 | |
| JP | S5230787 U | 3/1997 | |

OTHER PUBLICATIONS

Wikipedia, Pyrotechnic Initiator, Jun. 20, 2011, Wikipedia (Year: 2011).*

(Continued)

*Primary Examiner* — Todd E Manahan
*Assistant Examiner* — Kyle Robert Thomas
(74) *Attorney, Agent, or Firm* — Renner, Otto, Boisselle & Sklar, LLP (57) ABSTRACT

A solid rocket motor uses at least one thermally conductive wire or at least one pair of electrically conductive wires to increase a burn surface area of a propellant grain and thus a thrust of the rocket motor. The rocket motor includes a pulse chamber containing a burnable propellant grain, a propellant inhibited center bore bonded to surfaces of the burnable propellant grain, and at least one conductive wire coupled to the burnable propellant grain and arranged in variable regions along the propellant inhibited center bore. The conductive wire is configured for passive or active activation to ignite the propellant inhibited center bore that subsequently burns in the variable regions. The thermally conductive wire is formed of a refractory metal or refractory alloy material that enables the entire length of the wire to be heated simultaneously or nearly simultaneously when the wire is passively activated.

20 Claims, 5 Drawing Sheets

(56) References Cited

U.S. PATENT DOCUMENTS

| | | | | |
|---|---|---|---|---|
| 4,357,795 | A * | 11/1982 | Bastian | F02K 9/12 60/204 |
| 8,191,351 | B2 * | 6/2012 | Loehr | F02K 9/22 60/256 |
| 2009/0229245 | A1 * | 9/2009 | Koreki | F02K 9/22 60/253 |
| 2011/0023449 | A1 * | 2/2011 | Loehr | F02K 9/26 60/219 |
| 2017/0096968 | A1 * | 4/2017 | McBain | F02K 9/26 |
| 2017/0097213 | A1 * | 4/2017 | Villarreal | F02K 9/95 |
| 2018/0142646 | A1 * | 5/2018 | Minick | F02K 9/95 |

OTHER PUBLICATIONS

International Search Report and Written Opinion dated Oct. 5, 2021 in corresponding International Application No. PCT/US2021/016718.

* cited by examiner

VARIABLE BURN-RATE SOLID ROCKET MOTOR IGNITION METHOD

The invention relates to thrust systems for flight vehicles, and more particularly to thrust systems for solid rocket motors.

DESCRIPTION OF THE RELATED ART

Various applications use launchable payloads that are launched from a suitable platform, such as a land, sea, air, or space vehicle. The payload to be launched is dependent on the application. Military applications that use land vehicles, aircrafts, surface ships, or underwater vehicles may use deployable munitions as payloads. The payloads may be carried by a flight vehicle such as a missile having a solid rocket motor.

Conventional solid rocket motors have a thrust profile that is predefined when the motor is manufactured, such that the rocket motors may have a limited mission envelope. To allow some variation of the thrust profile, multiple pulse rocket motors may be used, but typically require complicated barrier and igniter systems with high mass fraction penalties of propellant relative to the mass of the flight vehicle. For example, a multi-pulse rocket motor having a predefined thrust profile may prevent the rocket motor from having more than two pulses.

SUMMARY OF THE INVENTION

The present application provides a solid rocket motor that uses thermally or electrically conductive wires to increase the burning surface area of a propellant grain and thus a thrust of the rocket motor. In a general embodiment, a rocket motor includes a pulse chamber containing a burnable propellant grain, a propellant inhibited center bore bonded to surfaces of the burnable propellant grain, and at least one conductive wire coupled to the burnable propellant grain and arranged in variable regions along the propellant inhibited center bore. The conductive wire is configured for either passive activation to conduct heat, or active activation to conduct electricity, and ignite the propellant inhibited center bore that subsequently burns in the variable regions. The conductive wire is formed of a refractory metal or refractory alloy material.

The thermally conductive wire may be passively activated when the propellant grain is ignited. The burn front of the propellant grain directly impinges the thermally conductive wire to heat the wire. Advantageously, an entire length of the wire is heated simultaneously or nearly simultaneously when the wire is activated. Any number of thermally conductive wires may be used and the number of wires may be increased to increase the burn surface of the propellant grain and thus the burn rate. The thermally conductive wires may be symmetrically arranged about the propellant inhibited center bore to generate a symmetrical burn profile.

In other embodiments, an electrically conductive wire may be connected to a power supply in the rocket motor, such that electricity is conducted between wires to cause an electro-chemical reaction that ignites the main propellant grain. The electrically conductive wire may be activated in response to an electrical signal such that the wire is activated actively, or on-demand.

The rocket motor may be a single-pulse rocket motor or a multi-pulse rocket motor having two, three, or more pulses. Some or all of the pulses may implement at least one thermally conductive wire to increase a burn surface area of the corresponding propellant grain.

According to an aspect of the invention, a rocket motor includes at least one thermally conductive wire to increase a burn surface area of a propellant grain.

According to an aspect of the invention, a rocket motor includes at least one thermally conductive wire formed of a refractory metal or metal alloy material.

According to an aspect of the invention, a rocket motor includes at least one thermally conductive wire that is passively activated by a burn front of a propellant grain.

According to an aspect of the invention, a rocket motor includes an electrically conductive pair of wires that is actively activated by a power source.

According to an aspect of the invention, a rocket motor includes a variable arrangement of conductive wires coupled to a propellant grain.

According to an aspect of the invention, a multi-pulse rocket motor includes an electrically conductive pair of wires or at least one thermally conductive wire to increase a burn surface area of a propellant grain for each pulse.

According to an aspect of the invention, a method of increasing a burn surface area of a burnable propellant grain in a rocket motor includes using an electrically conductive pair of wires or at least one thermally conductive wire coupled to the propellant grain.

According to an aspect of the invention, a rocket motor includes a pulse chamber containing a burnable propellant grain, a propellant inhibited center bore bonded to surfaces of the burnable propellant grain, and at least one conductive wire coupled to the burnable propellant grain and arranged in variable regions along the propellant inhibited center bore, the at least one conductive wire being configured for passive or active activation to ignite the propellant inhibited center bore that subsequently burns in the variable regions.

According to an embodiment of any paragraph(s) of this summary, the at least one conductive wire is thermally conductive and passively activated by a burn front of the burnable propellant grain that directly impinges the at least one conductive wire.

According to an embodiment of any paragraph(s) of this summary, an entire length of the at least one conductive wire is heated simultaneously or nearly simultaneously when the at least one thermally conductive wire is passively activated.

According to an embodiment of any paragraph(s) of this summary, the at least one conductive wire includes a pair of electrically conductive wires that are actively activated by an external power source arranged in the rocket motor.

According to an embodiment of any paragraph(s) of this summary, the at least one conductive wire extends along a length of the propellant inhibited center bore that is less than an entire length of the propellant inhibited center bore.

According to an embodiment of any paragraph(s) of this summary, the at least one conductive wire is formed of a refractory metal or refractory alloy material.

According to an embodiment of any paragraph(s) of this summary, the at least one conductive wire includes a plurality of wires arranged along the propellant inhibited center bore.

According to an embodiment of any paragraph(s) of this summary, the plurality of wires are arranged symmetrically about the propellant inhibited center bore.

According to an embodiment of any paragraph(s) of this summary, the at least one conductive wire is arranged proximate a burn surface of the burnable propellant grain.

According to an embodiment of any paragraph(s) of this summary, the at least one conductive wire is spaced from a burn surface of the burnable propellant grain.

According to an embodiment of any paragraph(s) of this summary, the at least one conductive wire includes a plurality of spaced wire segments arranged along the propellant inhibited center bore.

According to an embodiment of any paragraph(s) of this summary, the burnable propellant grain is an end-burning propellant grain.

According to an embodiment of any paragraph(s) of this summary, the rocket motor is a multi-pulse rocket motor including a second burnable propellant that is burned during a second pulse of the multi-pulse rocket motor, wherein the at least one conductive wire includes at least one second conductive wire that is coupled to the second burnable propellant.

According to an embodiment of any paragraph(s) of this summary, the multi-pulse rocket motor includes a third burnable propellant that is burned during a third pulse of the multi-pulse rocket motor, wherein the at least one conductive wire includes at least one third conductive wire that is coupled to the third burnable propellant.

According to another aspect of the invention, a rocket motor includes a pulse chamber containing a burnable propellant grain, a propellant inhibited center bore bonded to surfaces of the burnable propellant grain, at least one pair of electrically conductive wires coupled to the burnable propellant grain and arranged in variable regions along the propellant inhibited center bore, and a power supply coupled to the at least one pair of electrically conductive wires for electrically activating the at least one pair of electrically conductive wires thereby generating an electro-chemical reaction to ignite the propellant inhibited center that subsequently burns in the variable regions.

According to an embodiment of any paragraph(s) of this summary, the rocket motor is a multi-pulse rocket motor including a second burnable propellant that is burned during a second pulse of the multi-pulse rocket motor, wherein the at least one thermally conductive wire includes at least one second pair of electrically conductive wires that is arranged in the second pulse chamber.

According to still another aspect of the invention, a method of increasing a burn surface area of a propellant grain in a rocket motor includes selecting a length, number, refractory metal material, and arrangement of at least one conductive wire to increase a burn surface area in a rocket motor, coupling the at least one conductive wire to a burnable propellant grain by arranging the at least one conductive wire along a propellant inhibited center bore of the burnable propellant grain in a pulse chamber, igniting the burnable propellant grain, activating the at least one conductive wire, and igniting the propellant inhibited center bore via activation of the at least one conductive wire.

According to an embodiment of any paragraph(s) of this summary, the method includes passively activating at least one thermally conductive wire using a burn front of the burnable propellant grain that directly impinges the at least one thermally conductive wire, and heating simultaneously or nearly simultaneously an entire length of the at least one thermally conductive wire when the at least one thermally conductive wire is activated.

According to an embodiment of any paragraph(s) of this summary, the method includes actively activating at least one pair of electrically activated conductive wires via a power supply arranged in the rocket motor.

According to an embodiment of any paragraph(s) of this summary, the method includes coupling at least one second conductive wire to a second burnable propellant grain that is burned during a second pulse of the rocket motor, igniting the second burnable propellant grain, and activating the at least one second conductive wire.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

The principles described herein have application in defense applications, such as in a hypersonic vehicle or in any flight vehicle where space may be constrained. The rocket motor described herein may be implemented in any suitable flight vehicle. Single-pulse or multi-pulse rocket motors may be suitable. The rocket motor may be part of a missile that is suitable for carrying a payload. For example, the missile may include a payload module for carrying a munition for a military application.

Figure 1:
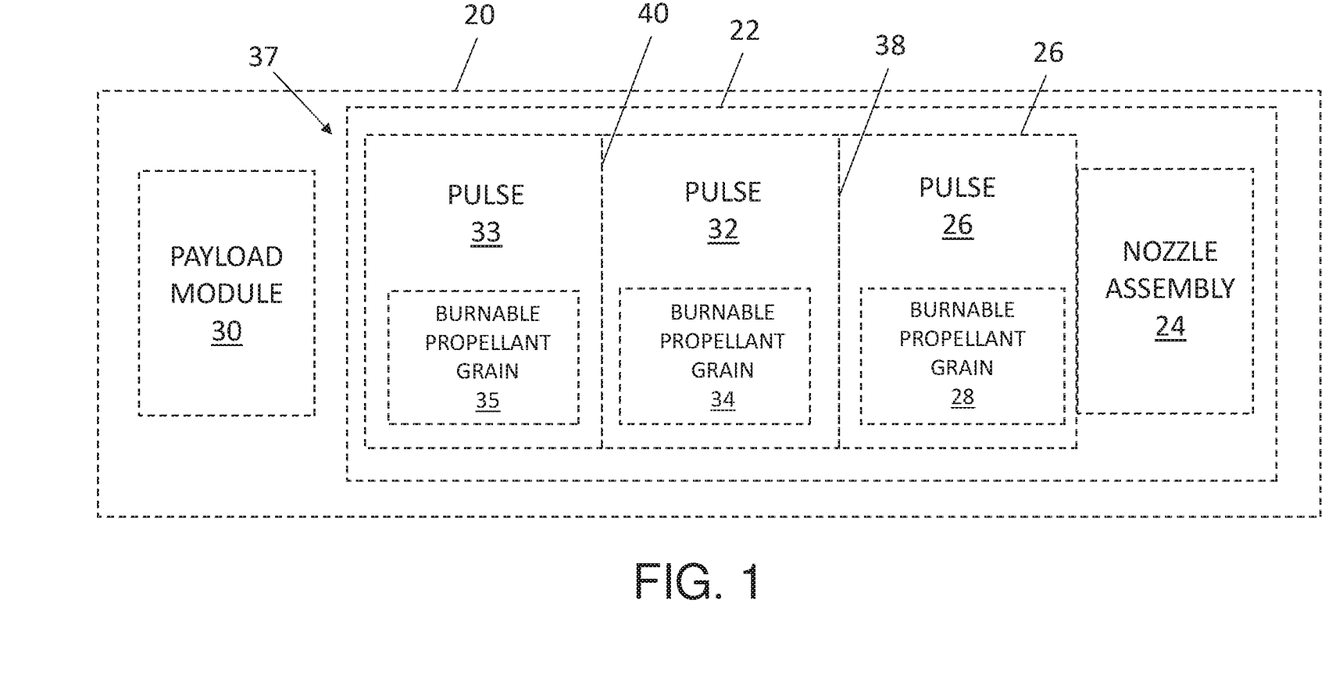
FIG. 1 shows a flight vehicle including a solid rocket motor containing burnable propellant grain segments.

Referring first to FIG. 1, a flight vehicle 20 including a rocket motor module 22 is shown. The rocket motor module 22 includes a nozzle assembly 24 having a throat and at least one pressure vessel 26 containing a burnable propellant grain 28. The flight vehicle 20 may include a payload module 30 for carrying a payload during normal operation of the flight vehicle 20, such as during execution of a military mission. The flight vehicle 20 may be configured for carrying any suitable payload and the payload module 30 may include a plurality of payloads. Exemplary payloads include satellites, space probes, cargo, or warheads. In an exemplary embodiment, the flight vehicle 20 may be a rocket that is configured to carry a warhead.

In an exemplary embodiment, the rocket motor module 22 may be a single-pulse rocket motor having a single pulse 26. The pressure vessel contains at least one segment of propellant grain 28. In other exemplary embodiments, the rocket motor module 22 may be a multi-pulse rocket motor that has one combustion chamber formed of metal or a composite case and multiple segments of propellant grain that each correspond to a pulse during which one of the segments is burned. As shown in FIG. 1, the rocket motor may have a first pulse 26 and at least one additional pulse 32, 33 that is initiated after the first pulse 26. In an exemplary embodiment of the multi-pulse rocket motor, an interpulse delay may occur between the pulses. The multi-pulse rocket motor module 22 may include two or more pulses. For example, as shown in FIG. 1, the rocket motor module 22 may include a third pulse 33.

Each of the pulses 26, 32, 33 includes a corresponding segment of burnable propellant grain 28, 34, 35. The propellant grain 28, 34, 35 may have different characteristics or the same characteristics. For example, the propellants may be configured to provide different burning rates relative to each other to achieve different thrust rates during the different pulses of the rocket motor module 22. Different amounts of the propellant grain 28, 34, 35 may be provided. The sizes and burn rates of the propellant grain 28, 34, 35 are dependent on the desired operation for a particular application of the rocket motor module 22 or flight vehicle 20.

When ignited, the solid propellant grain 28, 34, 35 is configured to burn and produce exhaust gas. The exhaust gas is directed through the nozzle assembly 24 to produce thrust for the flight vehicle 20. The shape and size of the propellant grain 28, 34, 35 is predetermined to achieve a specific burn time, amount of exhaust gas, and a thrust rate. In an exemplary embodiment, the propellant grain 28, 34, 35 may be an ammonium perchlorate composite propellant grain. Any other suitable propellant grain may be used. The propellant grain may be a centered perforated grain or an end-burning propellant. For example, the propellant grain 28 during the first pulse 26 may be a contoured secondary grain or center perforated grain having an end-web and the propellant grain 34, 35 in the secondary pulses 32, 33 may be an end-burning propellant grain. Many different configurations of the propellant grain 28, 34, 35 may be suitable.

In the secondary pulses 32, 33 corresponding to the end-burning propellant grain 34, 35, a burn front of the propellant grain 34, 35 propagates in a direction along the thrust direction, i.e. from the rearward or aft end of the rocket motor module 22 where the exhaust gases are expelled, toward a front end 37 of the rocket motor module 22, which is also toward the front end of the flight vehicle 20. In contrast, other propellant grain may have a burn front that propagates in a different direction along the corresponding propellant grain. The combustion at the burn front generates gaseous combustion by-products that are expelled from the rocket motor module 22 to produce thrust for the flight vehicle 20.

Each segment of propellant grain 28, 34, 35 are separated by a thin barrier formed of an electrically-activated solid propellant that is used to stop the burn of one pulse. The barrier may also act as an ignitor in that the barrier may start the burn of another pulse. Aft burn surfaces 38, 40 for the pulses 32, 33 and the end-web surface for the pulse 26 may be formed of the electrically-activated solid propellant. At least one vent passage also extends through the combustion chamber to equalize pressure on the propellant grain 28, 34, 35 during burning of the corresponding pulse segment in the rocket motor module 22.

FIGS. 2-5 show a pulse chamber 44 configured to provide an increased burn surface area of the propellant grain that consequently increases thrust of the rocket motor module 22. The increased burn surface area of the propellant grain is enabled by at least one thermally conductive wire 46 that is coupled to the propellant grain 48 and passively activated by the burn front of the burning propellant grain 48 to ignite the propellant grain. In other exemplary embodiments, a pair of electrically conductive wires may be arranged around the propellant grain 48 and electrically activated to cause an electro-chemical reaction that ignites the propellant grain, as described further below.

When the thermally conductive wire 46 is activated by the burn front, the thermally conductive wire 46 conducts heat and burns a region in the propellant grain 48 in which the thermally conductive wire 46 is arranged. The thermally conductive wire 46 used to increase the propellant burn surface area may be used in any of the pulses 26, 32, 33 shown in FIG. 1. Using the thermally conductive wire 46 may be particular advantageous to increase the burn surface area for an end-burning propellant grain 34, 35 as end-burning propellant grain typically burn more slowly as compared with other propellant grain.

The propellant grain 48 may include a propellant inhibited center bore 50 or insulating layer that is bonded to the propellant grain 48 and configured to prevent combustion from occurring on the surface of the propellant grain 48. The thermally conductive wire 46 may be arranged along the propellant inhibited center bore 50 such that the thermally conductive wire 46 extends along the propellant inhibited center bore 50. The propellant inhibited center bore 50 may extend through a central portion of the propellant grain 48 in the pulse chamber 44. Other arrangements of the thermally conductive wire 46 may be suitable. For example, the thermally conductive wire 46 may extend radially into the propellant grain.

The thermally conductive wire 46 is formed of any refractory metal or refractory alloy material, such as tungsten. Other suitable materials include metals and alloys having melting points that are greater than 2000 degrees Celsius, such as molybdenum, tantalum, niobium, chromium and rhenium. Metals and alloys having melting points above 1850 degrees Celsius may be suitable, including vanadium, hafnium, titanium, zirconium, ruthenium, osmium, rhodium, and iridium. Still other materials and alloys thereof may be suitable. The metal material may be selected as required for a particular application.

Any number of thermally conductive wires 46 may be used, such as one or more, and the number of wires may be dependent on the application. The configuration of the thermally conductive wires 46 is also dependent on the application. The regions in which the thermally conductive wire 46 is arranged may be varied along the propellant inhibited center bore 50. The thermally conductive wires 46 are arranged to have direct contact with the propellant grain 48 and may be laid underneath the propellant inhibited center bore 50, i.e. interposed between the propellant inhibited center bore 50 and the propellant grain 48. In exemplary embodiments, the thermally conductive wires 46 are embedded in the propellant grain 48. A length of the thermally conductive wire 46 extends along the propellant inhibited center bore 50 and may be less than an entire length of the propellant inhibited center bore 50. Any length of the thermally conductive wire 46 may be used.

Figure 2:
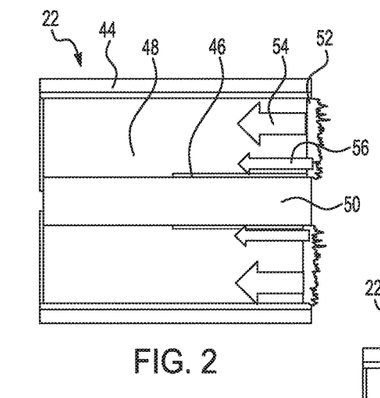
FIG. 2 shows a pulse chamber for a rocket motor module that includes a propellant grain and an arrangement of thermally conductive wires according to an exemplary embodiment of the present application in which the wires are configured for passive activation of a front half of the grain by a burn front of the propellant grain.
Figure 3:
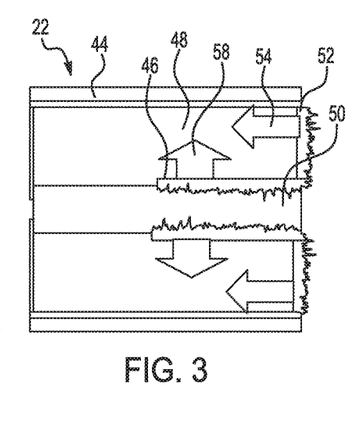
FIG. 3 shows the pulse chamber of FIG. 2 when the thermally conductive wires are activated to increase a burn surface area of a second half of the propellant grain.

As shown in the exemplary embodiment of FIGS. 2 and 3, the thermally conductive wire 46 may be arranged proximate a burn surface 52 of the propellant grain 48, such that a burn front 54 of the propellant grain 48 will directly impinge the thermally conductive wire 46 when the propellant grain 48 is ignited. If the propellant grain 48 is an end-burning propellant grain, the burn surface 52 may be an aft burn surface of the propellant grain 48. In other exemplary embodiments, the burn surface may be a forward burn surface or a surface arranged somewhere else along the propellant grain 48.

As shown in FIGS. 2 and 3, when the propellant grain 48 is ignited and burning of the propellant grain 48 begins, the burn front 54 is generated at the burn surface 52 and moves along the propellant grain 48. The propellant grain 48 may be ignited using any suitable ignitor. For example, the propellant grain 48 may be an ammonium perchlorate composite propellant, or any other suitable propellant grain, that may be activated by the electrically-activated solid propellant barrier/igniter 38, 40 (shown in FIG. 1). Other propellant grain types and activation methods may also be suitable for ignition of the propellant grain.

As shown in FIGS. 2 and 3, in an end-burning propellant, the burn front 54 moves in a forward direction opposite the aft direction toward a front of the rocket motor module 22. The burn front 54 of the propellant grain 48 directly impinges the thermally conductive wire 46 which is configured to conduct heat 56. Advantageously, as soon as the burn front 54 impinges the thermally conductive wire 46 to activate the thermally conductive wire 46, the entire length of the thermally conductive wire 46 is simultaneously or nearly simultaneously heated. As shown in FIG. 3, the propellant inhibited central bore 50 is thus ignited and the burn front 58 burns the propellant inhibited central bore 50 only in the region in which the thermally conductive wire 46 is arranged. By simultaneously or nearly simultaneously heating the thermally conductive wire 46, the entire region of the thermally conductive wire 46 is also simultaneously or nearly simultaneously burned. Accordingly, using the thermally conductive wire 46 enables passively increasing the burn surface area for the propellant grain 48 via the burn front of the propellant grain 48 that also activates the thermally conductive wire 46.

Figure 4:
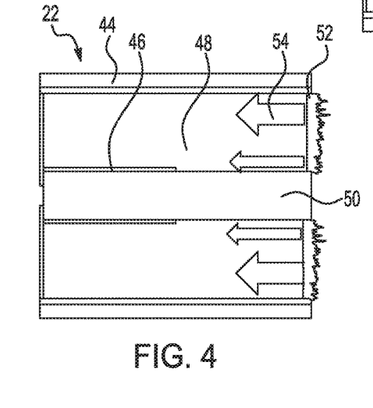
FIG. 4 shows a pulse chamber for a rocket motor module that includes a propellant grain and an arrangement of thermally conductive wires according to another exemplary embodiment of the present application.
Figure 5:
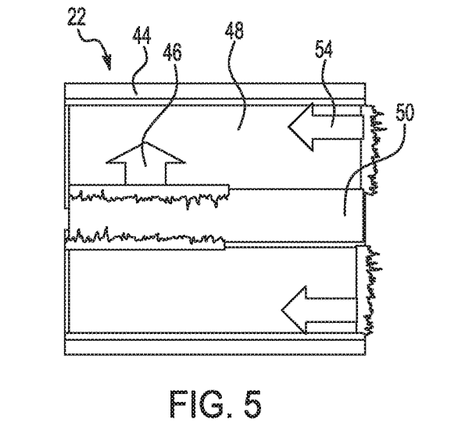
FIG. 5 shows the pulse chamber of FIG. 4 when the thermally conductive wires are activated to increase a burn surface area of the propellant grain.

While FIGS. 2 and 3 show an arrangement of the thermally conductive wires 46 for increasing the burn surface area of the first half of the propellant grain 48, FIGS. 4 and 5 show an arrangement of the thermally conductive wires 46 for increasing the burn surface area of the second half of the propellant grain 48. As shown in FIGS. 4 and 5, the thermally conductive wire 46 may be arranged to be spaced away from the burn surface 52 of the propellant grain 48. Similar to the burning showed in FIGS. 2 and 3, the burn front 54 of the propellant grain 48 will move along the propellant grain 48 in the forward direction away from the aft burn surface 52. When the burn front 54 directly impinges the thermally conductive wire 46, the entire length of the thermally conductive wire 46 will be heated simultaneously or nearly simultaneously.

As shown in FIG. 5, the propellant inhibited central bore 50 is then ignited and the burn front 58 burns the propellant inhibited central bore 50 only in the region in which the thermally conductive wire 46 is arranged. By spacing the thermally conductive wire 46 away from the burn surface 52, a slight delay in the activation of the thermally conductive wire 46 may occur such that the second half of the burn sequence occurring during the pulse may be enhanced, as compared with enhancing the first half of the burn sequence as shown in FIGS. 3 and 4.

Figure 6:
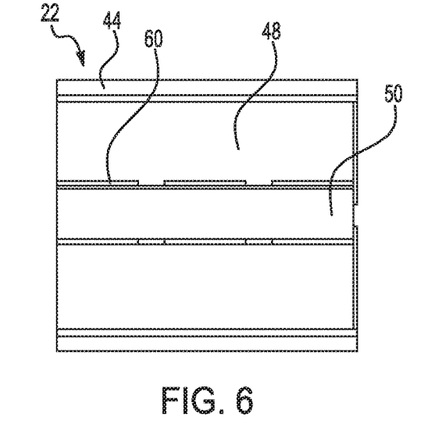
FIG. 6 shows a pulse chamber for a rocket motor module that includes a propellant grain and an arrangement of thermally conductive wires according to still another exemplary embodiment of the present application.

FIG. 6 shows still another exemplary embodiment of the thermally conductive wire in which the thermally conductive wire includes a plurality of wire segments 60 that are coupled to the propellant grain 48 and arranged along the propellant inhibited central bore 50. Any arrangement of the wire segments 60 may be suitable. Using the wire segments 60 may thus cause periodic enhancements during the burn sequence for a corresponding pulse of the rocket motor module 22. The segments 60 may be evenly spaced or non-uniformly spaced to achieve a specific burn rate as required for a particular application.

Figure 7:
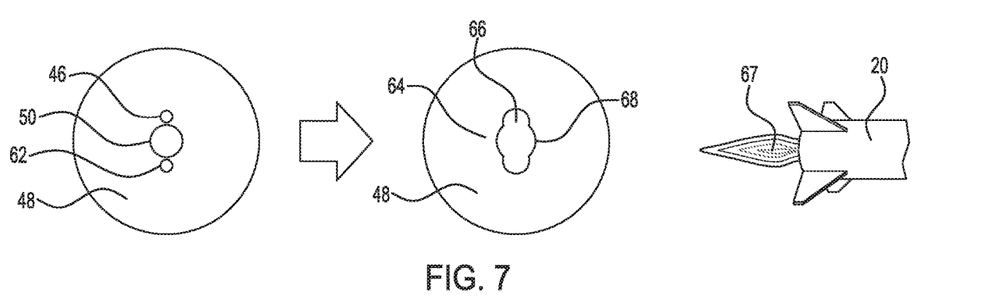
FIG. 7 shows a burn profile for an arrangement of thermally conductive wires according to an embodiment of the present application.
Figure 8:
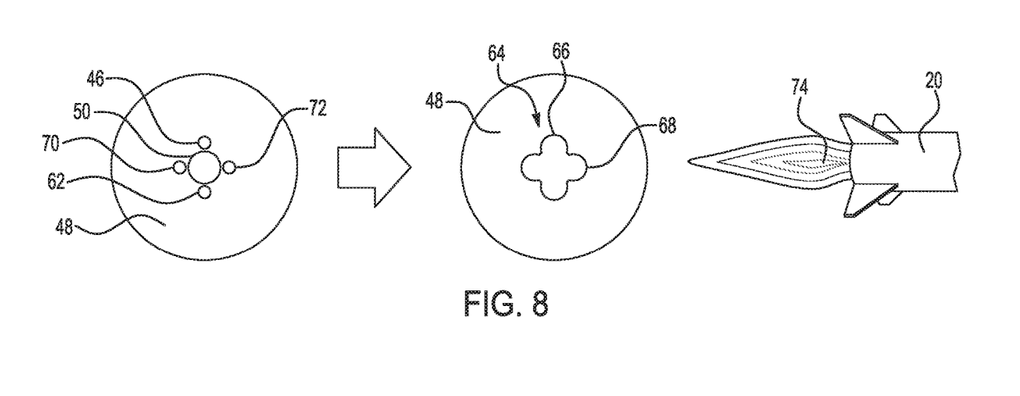
FIG. 8 shows a burn profile for an arrangement of thermally conductive wires according to another embodiment of the present application in which the burn surface area and thrust is increased as compared with the burn profile of FIG. 7.

FIGS. 7 and 8 show front views of different arrangements of the thermally conductive wires 46. As shown in FIG. 7, the thermally conductive wires may include a first thermally conductive wire 46 and a second thermally conductive wire 62 that are coupled to the propellant grain 48 and arranged symmetrically on opposite sides of the propellant inhibited central bore 50. The burn surface profile 64 for the two thermally conductive wires 46, 62 includes a burn surface area 66 that is increased in the region where the thermally conductive wires 46, 62 are arranged, as compared with a burn surface area 68 around the propellant inhibited central bore 50 in which thermally conductive wires are not arranged. The burn surface profile 64 may also be substantially symmetrical as a result of the arrangement of the thermally conductive wires. The thrust 67 for the flight vehicle 20 corresponding to the burn profile 64 is also schematically shown.

As shown in FIG. 8, four thermally conductive wires 46, 62, 70, 72 may be coupled to the propellant grain 48 and arranged about the propellant inhibited central bore 50. The thermally conductive wires 46, 62 may be oppositely arranged relative to each other and the thermally conductive wires 70, 72 may be oppositely arranged relative to each other. The arrangement of the thermally conductive wires 46, 62, 70, 72 may be symmetrical. In other exemplary embodiments, an odd number of thermally conductive wires may also be used. The burn surface profile 64 for the propellant grain 48 including four thermally conductive wires 46, 62, 70, 72 includes increased burn surface areas 66, 68 in all of the regions in which the thermally conductive wires 46, 62, 70, 72 are arranged. Accordingly, the flight vehicle 20 has an increased amount of thrust 74 as compared with the amount of thrust 67 associated with the burn surface profile 64 for only two thermally conductive wires 46, 62, as shown in FIG. 7.

Figure 9:
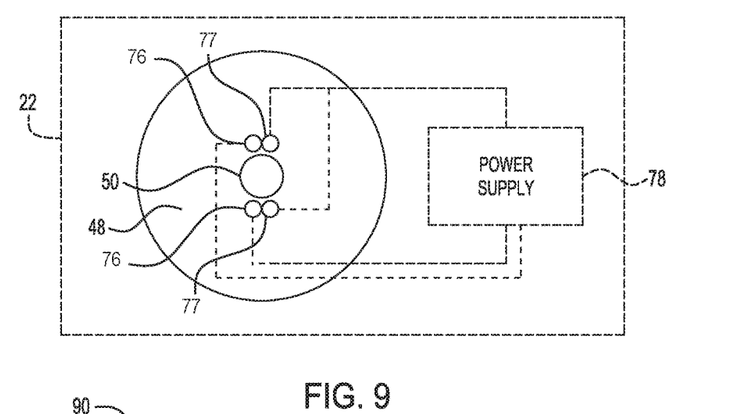
FIG. 9 shows an arrangement of thermally conductive wires according to still another embodiment of the present application in which the wires are configured to be actively activated by a power source.

FIG. 9 shows another exemplary embodiment of the rocket motor in which at least one pair of electrically conductive wires 76, 77 is arranged around the propellant grain 48. A refractory metal or refractory alloy material, such as tungsten may be a suitable material for the electrically conductive wires 76, 77. The electrically conductive wires 76, 77 are spaced relative to each other and are configured to conduct electricity through the propellant grain 48 between the electrically conductive wires 76, 77 to cause an electro-chemical reaction that ignites the propellant grain 48. Each of the electrically conductive wires 76, 77 is connected to a power supply 78 arranged in the rocket motor module 22. The power supply 78 is configured to receive an electrical signal and supply a current to the electrically conductive wires 76, 77. Using the electrically conductive wires 76, 77 enables the active or on-demand activation as compared with the passive activation by the burning of the propellant shown in FIGS. 2-6.

When the electrically conductive wires 76, 77 are activated, the electrically conductive wires 76, 77 operate similarly to the thermally conductive wires that are passively activated in that the entire length of the electrically conductive wires 76, 77 is utilized simultaneously or nearly simultaneously. The propellant grain 48 is ignited separately, such as by the electrically-activated propellant barrier. Accordingly, the propellant inhibited central bore 50 is ignited and the regions in which the electrically conductive wires 76, 77 are arranged are burned and ablated.

Actively activating the electrically conductive wires 76, 77 is advantageous in providing more selective control over when the burn surface area is increased for increasing the thrust of the rocket motor module 22. Using the active activation may be particularly advantageous when the electrically conductive wires 76, 77 are arranged away from the burn surface for the propellant grain 48. In exemplary embodiments, both thermally conductive wires and electrically conductive wires may be implemented in a rocket motor to enable passive and/or active activation in different pulses.

Figure 10:
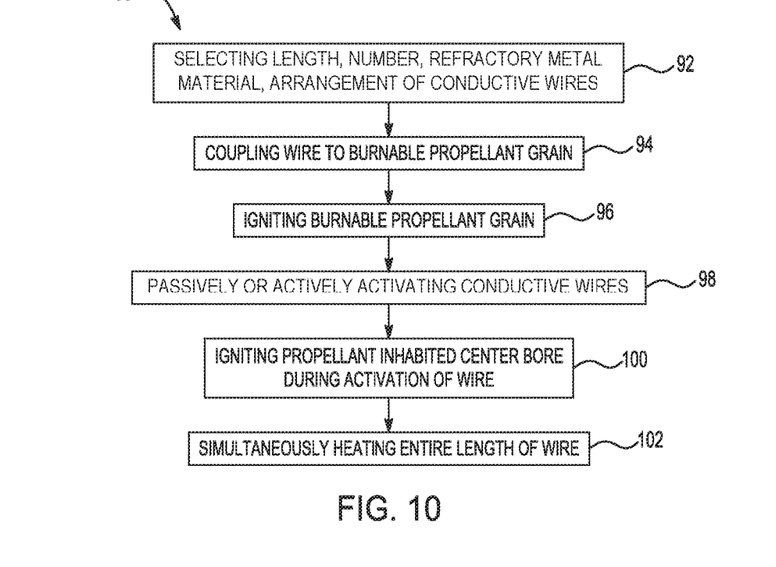
FIG. 10 shows a method of increasing a burn surface area of a burnable propellant grain in a rocket motor.

Referring now to FIG. 10, a method 90 of increasing a burn surface area for a propellant grain in a rocket motor is shown. Step 92 of the method 90 includes selecting a length, number, refractory metal material, and arrangement of at least one conductive wire to increase a burn area in a rocket motor, such as the rocket motor module 22 shown in FIG. 1. Any of the arrangements of the thermally or electrically conductive wires shown in FIGS. 2-9 may be used. The arrangement may be symmetrical. The number of conductive wires 46, 76, 77 may be increased to increase a burn surface area as required for a particular application. Tungsten or any other suitable refractory metal material may be used. Step 94 of the method 90 includes coupling the conductive wire 46, 76, 77 to a burnable propellant grain 48 by arranging the conductive wire 46 along a propellant inhibited center bore 50 of the burnable propellant grain 48 in a pulse chamber 44, as shown in FIGS. 2-5.

Step 96 of the method 90 includes igniting the burnable propellant grain 48, which may be ignited by an electrically-activated propellant. Step 98 of the method 90 includes passively or actively activating the conductive wires 46, 76, 77. Passively activating the thermally conductive wire 46 includes using a burn front of the burnable propellant grain 48 that directly impinges the thermally conductive wire 46. For example, the burnable propellant grain 48 may be an end-burnable propellant grain, such that the burn front moves from an aft surface toward a front surface, relative to a direction of travel of the flight vehicle. Actively activating the electrically conductive pair of wires 76, 77 includes activating the wire 76, 77 via a power supply 78 arranged in the rocket motor module 22, as shown in FIG. 9. For example, an electrical signal may be used to activate the electrically conductive pair of wires 76, 77.

Step 100 of the method 90 includes igniting the propellant inhibited center bore 50 via the conductive wires 46, 76, 77 conducting heat during activation. Step 102 includes heating simultaneously or nearly simultaneously an entire length of the thermally conductive wire 46 when the thermally conductive wire 46 is passively activated. The propellant inhibited center bore 50 is then ablated where the conductive wires 46, 76, 77 are arranged such that the burn surface area and burn rate for the corresponding pulse is increased. In an exemplary embodiment in which the rocket motor module 22 is a multi-pulse rocket motor, the method 90 may include coupling a second conductive wire to a second burnable propellant grain that is burned during a second pulse of the multi-pulse rocket motor, igniting the second burnable propellant grain, and activating the second conductive wire. The method 90 may be performed for one, two, three, or more pulses in a single rocket motor or in a multi-pulse rocket motor.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (external components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A rocket motor comprising:
a pulse chamber containing a burnable propellant grain;
a propellant inhibited center bore bonded to surfaces of the burnable propellant grain; and
at least one conductive wire coupled to the burnable propellant grain and arranged in variable regions along the propellant inhibited center bore, the at least one conductive wire being configured for passive or active activation to ignite and ablate the propellant inhibited center bore that subsequently burns in the variable regions, wherein the at least one conductive wire is interposed between the propellant inhibited center bore and the propellant grain to increase a burn surface area of the burnable propellant grain via ablation of the propellant inhibited center bore;
wherein the propellant inhibited center bore includes an electrically-activated propellant that undergoes an electro-chemical burning reaction when electrically activated, and that inhibits combustion when not electrically activated.

2. The rocket motor according to claim 1, wherein the at least one conductive wire is thermally conductive and passively activated by a burn front of the burnable propellant grain that directly impinges the at least one conductive wire.

3. The rocket motor according to claim 2, wherein an entire length of the at least one conductive wire is heated simultaneously or nearly simultaneously when the at least one conductive wire is passively activated.

4. The rocket motor according to claim 1, wherein the at least one conductive wire includes a pair of electrically conductive wires that are actively activated by an external power source arranged in the rocket motor.

5. The rocket motor according to claim 1, wherein the at least one conductive wire extends along a length of the propellant inhibited center bore that is less than an entire length of the propellant inhibited center bore.

6. The rocket motor according to claim 1, wherein the at least one conductive wire is formed of a refractory metal or refractory alloy material.

7. The rocket motor according to claim 1, wherein the at least one conductive wire includes a plurality of wires arranged along the propellant inhibited center bore.

8. The rocket motor according to claim 7, wherein the plurality of wires are arranged symmetrically about the propellant inhibited center bore.

9. The rocket motor according to claim 1, wherein the at least one conductive wire is arranged proximate a burn surface of the burnable propellant grain.

10. The rocket motor according to claim 1, wherein the at least one conductive wire is spaced from a burn surface of the burnable propellant grain.

11. The rocket motor according to claim 1, wherein the at least one conductive wire includes a plurality of spaced wire segments arranged along the propellant inhibited center bore.

12. The rocket motor according to claim 1, wherein the burnable propellant grain is an end-burning propellant grain.

13. The rocket motor according to claim 1, wherein the rocket motor is a multi-pulse rocket motor including a second burnable propellant that is burned during a second pulse of the multi-pulse rocket motor, wherein the at least one conductive wire includes at least one second conductive wire that is coupled to the second burnable propellant.

14. The rocket motor according to claim 13, wherein the multi-pulse rocket motor includes a third burnable propellant that is burned during a third pulse of the multi-pulse rocket motor, wherein the at least one conductive wire includes at least one third conductive wire that is coupled to the third burnable propellant.

15. A rocket motor comprising:
a pulse chamber containing a burnable propellant grain;
a propellant inhibited center bore bonded to surfaces of the burnable propellant grain;
at least one pair of electrically conductive wires coupled to the burnable propellant grain and arranged in variable regions along the propellant inhibited center bore; and
a power supply coupled to the at least one pair of electrically conductive wires for electrically activating the at least one pair of electrically conductive wires thereby generating an electro-chemical burning reaction to ignite and ablate the propellant inhibited center bore that subsequently burns in the variable regions, wherein the at least one conductive wire is interposed between the propellant inhibited center bore and the propellant grain to increase a burn surface area of the burnable propellant grain via ablation of the propellant inhibited center bore;
wherein the propellant inhibited center bore includes an electrically-activated propellant that undergoes the electro-chemical burning reaction when electrically activated, and that inhibits combustion when not electrically activated.

16. The rocket motor according to claim 15, wherein the rocket motor is a multi-pulse rocket motor including a second burnable propellant that is burned during a second pulse of the multi-pulse rocket motor, wherein at least one second pair of electrically conductive wires is arranged in a second pulse chamber.

17. A method of increasing a burn surface area of a propellant grain in a rocket motor, the method comprising:
selecting a length, number, refractory metal material, and arrangement of at least one conductive wire to increase a burn surface area in a rocket motor;
coupling the at least one conductive wire to a burnable propellant grain by arranging the at least one conductive wire in variable regions along a propellant inhibited center bore of the burnable propellant grain in a pulse chamber;
igniting the burnable propellant grain;
activating the at least one conductive wire; and
igniting and ablating the propellant inhibited center bore via activation of the at least one conductive wire, wherein the at least one conductive wire is interposed between the propellant inhibited center bore and the propellant grain to increase a burn surface area of the burnable propellant grain via ablation of the propellant inhibited center bore, wherein the propellant inhibited center bore includes an electrically-activated propellant that undergoes an electro-chemical burning reaction when electrically activated to subsequently burn in the variable regions, and that inhibits combustion when not electrically activated.

18. The method according to claim 17 further comprising passively activating at least one thermally conductive wire using a burn front of the burnable propellant grain that directly impinges the at least one thermally conductive wire; and
heating simultaneously or nearly simultaneously an entire length of the at least one thermally conductive wire when the at least one thermally conductive wire is activated.

19. The method according to claim 17 further comprising actively activating at least one pair of electrically activated conductive wires via a power supply arranged in the rocket motor.

20. The method according to claim 17 further comprising:
coupling at least one second conductive wire to a second burnable propellant grain that is burned during a second pulse of the rocket motor;
igniting the second burnable propellant grain; and
activating the at least one second conductive wire.

* * * * *